Dec. 2, 1924.
P. B. NEWKIRK
VEHICLE SPRING
Filed Nov. 24, 1922
1,517,855
2 Sheets-Sheet 1
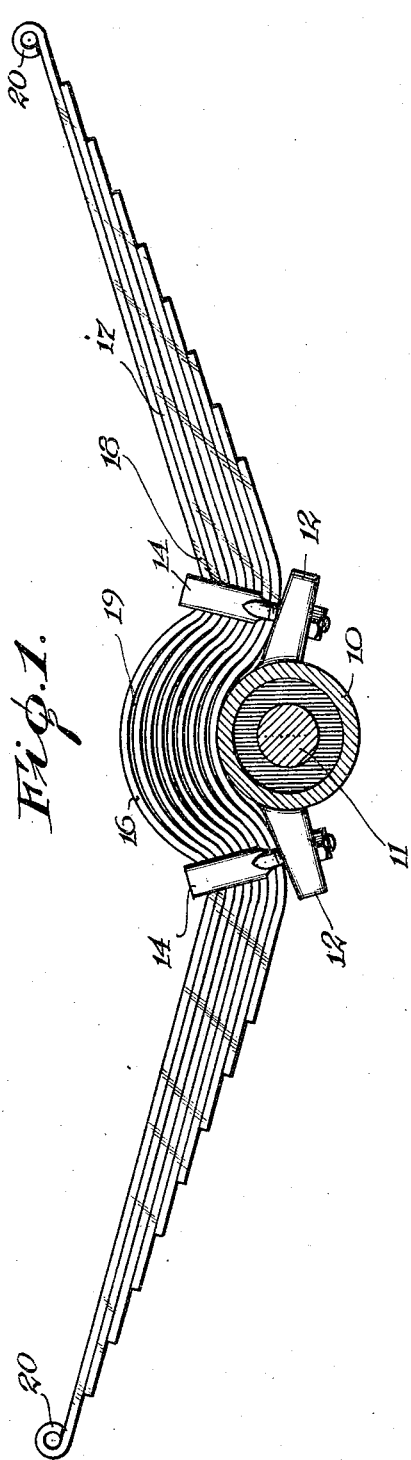
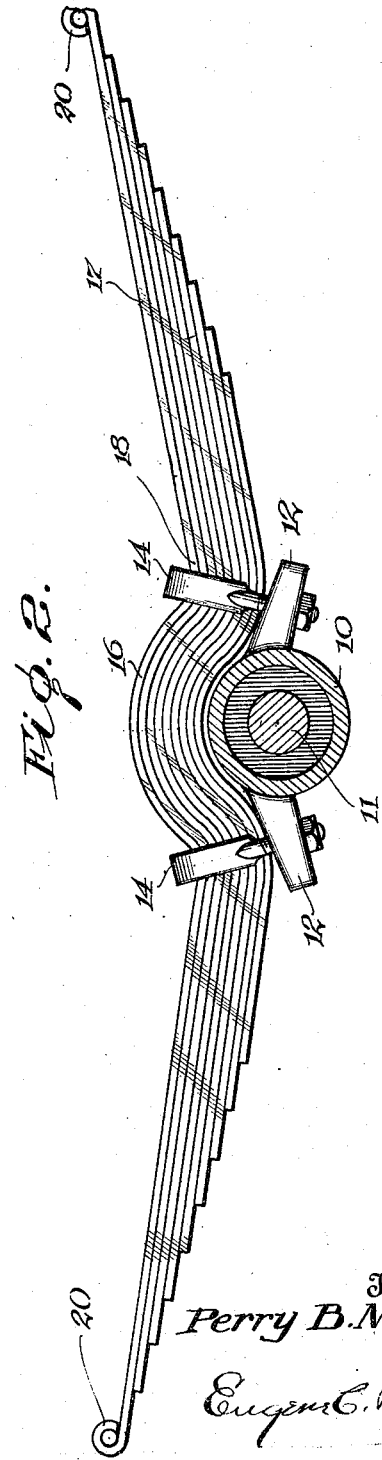
Inventor
Perry B. Newkirk
Eugene C. Brown
Attorney Dec. 2, 1924.
P. B. NEWKIRK
VEHICLE SPRING
Filed Nov. 24, 1922
1,517,855
2 Sheets-Sheet 2
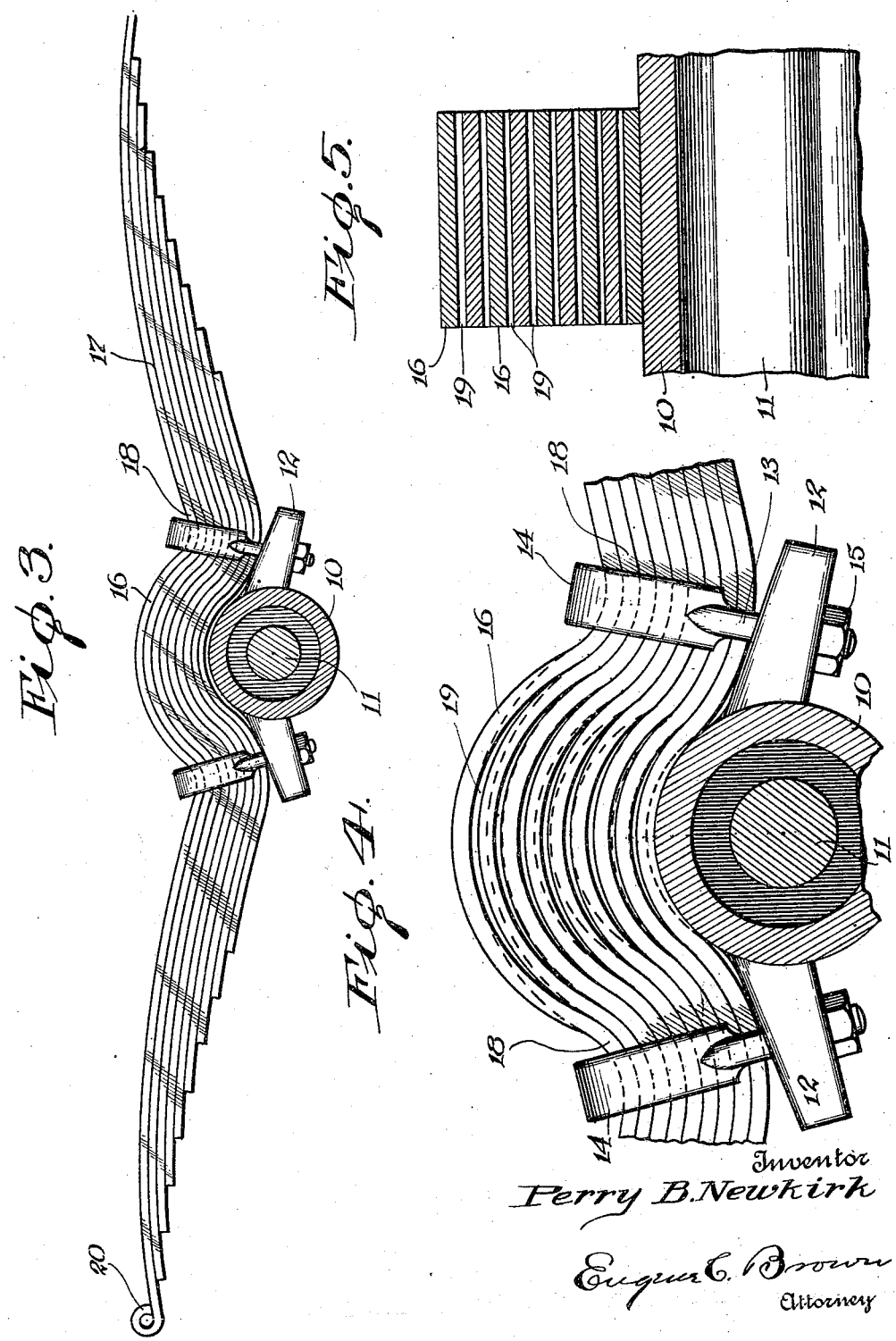

Patented Dec. 2, 1924.

1,517,855

UNITED STATES PATENT OFFICE.

PERRY B. NEWKIRK, OF SEATTLE, WASHINGTON.

VEHICLE SPRING.

Application filed November 24, 1922. Serial No. 603,109.

*To all whom it may concern:*

Be it known that I, PERRY B. NEWKIRK, a citizen of the United States, residing at Seattle, in the county of King and State of Washington, have invented certain new and useful Improvements in Vehicle Springs, of which the following is a specification.

My invention relates to improvements in vehicle springs of the multi-leaf semi-elliptic type, and has for its main purpose the provision of a spring of this type wherein the spring will yield more readily to loading up to a certain point, which may be termed the maximum normal load point, than it will to greater loads.

The mechanical principle involved is that of shortening the moment arms of the spring and this shortening of these arms is brought about, in effect, by the construction of the spring itself and not in external stops or fulcra against which the spring may bear when heavily loaded.

A vehicle provided with springs embodying my invention will be found to ride easily and comfortably under all conditions of loading since the spring will flex readily under light loads while they will automatically stiffen up and become less flexible under heavy loads.

In the following description, I shall refer to the following drawings, in which:—

Fig. 1 is a side elevation of a spring with an axle mounting therefor as it appears under unloaded conditions.

Fig. 2 is a view similar to Fig. 1, but showing the spring in the position assumed under maximum normal or light load conditions.

Fig. 3 is a view similar to Figures 1 and 2, but showing the appearance of the spring under heavy loading.

Fig. 4 is an enlarged view of the central or axle supported part of my spring with the leaves shown in unloaded condition in full lines and in loaded condition in dotted lines.

Fig. 5 is a section on the line 5—5 of Figure 4, the dotted line portion being omitted.

The spring seat used for the center of this spring is here shown as consisting of a central or body portion 10 of hollow cylindrical form so that it may surround the axle 11. From this body portion extend the anti-clinally arranged wings 12. Thus between the wings the upper part of the body forming the center of the spring seat is segmento-cylindrical. The wings 12 are provided with openings for the reception of the threaded ends 13 of the spring clips 14 which are held in position by the usual nuts 15.

The spring itself consists of a series of leaves, each having an upwardly bowed central portion 16 and oppositely disposed normally straight end portions 17 connected to the central portion by portions 18 curved reversely to the central portion. The reversely curved portions are held beneath the spring clips and are graduated in radius so that they are concentric to each other. The central portions are, under normal conditions, all of substantially the same radius with the arc centers in vertically spaced relation so that these bowed centers are eccentric to each other, whereby gaps 19 exist between adjacent central portions under unloaded or lightly loaded conditions. The spring leaves are graduated in length, the upper leaf being the longest and each succeeding leaf being shorter than the one above it. The upper or longest leaf is preferably provided with the usual eye 20 for the reception of the ordinary spring shackle bolts (not shown).

In use my spring under unloaded condition appears as in Fig. 1 with the bowed central portions vertically spaced and the leaf ends straight and inclined upwardly from the center toward the ends so that they are synclinally arranged. As load is applied to the spring the ends beyond the clips swing downwardly but remain straight until the maximum light load is reached. Under such conditions of light loading the central bowed portions gradually approach each other until the maximum light load is reached at which time they will be in contact and the spring will appear as in Fig. 2. Up to this point the moment arm of each half of the spring will be substantially half the distance between the extremities of the longest leaf. Until the point is reached at which the central bowed portions are in contact the lengths of these moment arms will not vary appreciably but when this point is reached the condition of the center of the spring becomes the same as if it were rigid, and all further flexure takes place beyond the spring clips so that the moment arms are, in effect, shortened and further loading causes the spring ends to assume a position similar to Fig. 3 with the ends curved downwardly.

From the foregoing it is plain that the spring under light load will ride easily while it also rides easily under heavy load. It will be noted that this is a complete distinction from the ordinary spring which, if designed for a light load, cannot properly support a heavy load or, if designed for a heavy load, can only ride easily when fully loaded.

I have described in detail the particular construction illustrated in the accompanying drawings for the purpose of clearly disclosing an embodiment of my invention, but it will be evident to those skilled in the art that various changes and modifications may be made without departing from my invention.

I claim:

1. A vehicle spring including a series of leaves arranged one above the other and having their central portions spaced one from the other under unloaded conditions and their ends contacting throughout on each side of said central portions.

2. A vehicle spring including a series of leaves each having an upwardly bowed central portion and oppositely directed end portions, said central portions being arranged to provide gaps between adjacent leaves under unloaded and lightly loaded conditions, said end portions contacting throughout their lengths, and clips binding the leaves together on each side of the central portions.

3. A vehicle spring including a series of leaves each having an upwardly bowed central portion and synclinally arranged end portions, said upwardly bowed portions under unloaded and lightly loaded conditions being all of substantially the same radius and eccentrically arranged to provide gaps between adjacent central portions, said end portions being in contact throughout their lengths, and means for clamping the leaves together at each side of the central portions.

4. A vehicle spring including a series of leaves each having an upwardly bowed central portion and synclinally arranged end portions connected to the central portion by intermediate portions curved reversely to the central portion, said upwardly bowed portions under unloaded and lightly loaded conditions being all of substantially the same radius and eccentrically disposed whereby to provide gaps between adjacent central portions under said conditions, said reversely curved portions contacting with each other in concentric arrangement, the end portions being in contact throughout, and means to clamp the reversely curved portions of the leaves together.

5. A vehicle spring including a series of leaves each having an upwardly bowed central portion and synclinally arranged end portions connected to the central portion by intermediate portions curved reversely to the central portion, said upwardly bowed portions under unloaded and lightly loaded conditions being all of substantially the same radius and eccentrically disposed whereby to provide gaps between adjacent central portions under said conditions, said reversely curved portions contacting with each other in concentric arrangement, the end portions being in contact throughout, a spring seat comprising an upwardly bowed segmento-cylindrical central portion beneath the central leaf portions, and anticlinal wings extending from the central portion beneath the reversely curved leaf portions, and spring clips binding the reversely curved leaf portions together and to said wings.

In testimony whereof I affix my signature.

PERRY B. NEWKIRK.